United States Patent
Anderson et al.

(10) Patent No.: US 9,194,487 B2
(45) Date of Patent: Nov. 24, 2015

(54) SYSTEM AND METHOD FOR AUTOMATICALLY DOWNSHIFTING AN AUTOMATIC TRANSMISSION WITH ALTERNATE FORWARD LAUNCH GEAR

(75) Inventors: Robert Anderson, Dunlap, IL (US);
James Landes, East Peoria, IL (US);
David Dickrell, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1020 days.

(21) Appl. No.: 13/053,747

(22) Filed: Mar. 22, 2011

(65) Prior Publication Data

US 2012/0245812 A1    Sep. 27, 2012

(51) Int. Cl.
*F16H 59/66* (2006.01)
*F16H 59/72* (2006.01)
*F16H 59/36* (2006.01)
*F16H 61/02* (2006.01)

(52) U.S. Cl.
CPC ...... *F16H 61/0213* (2013.01); *F16H 2061/023* (2013.01); *F16H 2312/02* (2013.01)

(58) Field of Classification Search
CPC .............. F16H 61/16; F16H 2061/023; F16H 2059/003; F16H 2312/02; F16H 2059/142; F16H 2059/743; F16H 59/78
USPC .......................................................... 701/60
See application file for complete search history.

(56) References Cited

U.S. PATENT DOCUMENTS

| 3,667,325 | A | | 6/1972 | Ito et al. |
| 4,262,555 | A | | 4/1981 | van der Lely |
| 5,406,862 | A | * | 4/1995 | Amsallen ................... 74/336 R |
| 5,553,694 | A | | 9/1996 | Schulz et al. |
| 5,662,548 | A | | 9/1997 | Mori |
| 6,151,978 | A | | 11/2000 | Huber |
| 6,676,566 | B2 | | 1/2004 | Ohashi et al. |
| 7,441,643 | B2 | | 10/2008 | McCunn et al. |
| 2010/0121543 | A1 | | 5/2010 | Landes et al. |

OTHER PUBLICATIONS

TIER 4 INTERIM; "*Tier 4 EPA Compliant Engines; The Who, What & When*"; website; http://blog.aztecrentalcenters.com/2010/11/12/tier-4-epa-compliant-engines-the-who-what-&-when; Nov. 12, 2010; pp. 1-7.

* cited by examiner

*Primary Examiner* — Mussa A Shaawat
*Assistant Examiner* — Kyung Kim
(74) *Attorney, Agent, or Firm* — Miller, Matthias & Hull LLP (57) ABSTRACT

An electronic control system for an automatic transmission having an alternate forward start gear, a lower forward start gear and a lower forward start gear lock our feature, in which the electronic control system can sense from various conditions when more power to the drive train is needed and cause the automatic transmission to automatically downshift to the lower forward start gear.

13 Claims, 5 Drawing Sheets

SYSTEM AND METHOD FOR AUTOMATICALLY DOWNSHIFTING AN AUTOMATIC TRANSMISSION WITH ALTERNATE FORWARD LAUNCH GEAR

TECHNICAL FIELD

This disclosure relates generally to automatic transmissions for off road machines. More particularly, this disclosure relates to an automatic transmission having an alternate start gear mode and a control system that senses when more power is needed to the machine wheels and causes the transmission to automatically downshift before the machine experiences inadequate performance which inhibits forward movement.

BACKGROUND

Many off road machines with automatic transmissions have an alternate start gear (typically second gear) besides first gear. And many of these automatic transmissions are equipped with a first gear lock out feature that prevents the transmission from operating in first gear while the gear shift lever is set in the normal drive (D) mode. In these machines, first gear only becomes available if the gear shift lever is set in a lower gear, such as D1 or D2.

A benefit of having a transmission with an alternate start gear is that it eliminates the time it takes to shift from first to second gear. Also, shifting from first to second gear can take so much time, sometimes three quarters to one and a quarter seconds, that it interrupts machine acceleration, especially in large heavy duty off road trucks.

U.S. Pat. No. 6,676,566 discloses a control system for a machine with an automatic transmission which sets a second starting shift position in a lower gear relative to a first shift position and then automatically changes from the first to the second shift position when a slow running intention is detected. The control system has a manual mode in which the driver can indicate a slow running intention and an automatic mode in which the shift position is automatically selected. Unlike the present invention, the invention disclosed in the '566 patent does not include a standard/default start gear and does not automatically downshift to an alternative (lower) start gear if conditions might otherwise cause the machine to have inadequate performance, including inhibiting the machine from moving forward.

It would therefore be beneficial to provide a system and method for controlling an automatic transmission having an alternate forward start gear in which the control system can sense from various environmental and machine conditions when more power is needed and cause the transmission to automatically downshift.

SUMMARY OF THE DISCLOSURE

In accordance with one aspect of the present disclosure, there is provided an electronic control system for use with a machine. The machine is equipped with an engine and an automatic transmission. The automatic transmission has at least an alternate forward start (which may be second gear or higher) and a lower forward start gear (which may be first gear) and a lower forward start gear lock out feature that prevents starting in the lower forward start gear while the automatic transmission, and thus the machine, is in the normal drive mode. The electronic control system comprises one or more sensors and a transmission electronic controller. The one or more sensors detect certain preselected environmental and machine conditions, such as engine speed, transmission speed, oil temperature, vehicle payload and percent grade of the terrain beneath the machine and provide input to the transmission electronic controller. The transmission electronic controller is in communication with the one or more sensors, the engine and the automatic transmission, either via one or more wired and/or wireless communication lines or other similar input/output circuits. The transmission electronic controller is configured to receive an output from at least one of the sensors, determine whether the environmental and machine conditions will inhibit forward movement of the machine to the extent that the machine will have inadequate performance and, if needed, initiate a downshift of the automatic transmission from the alternate forward start gear to the lower forward start gear.

In another aspect of the invention a machine is provided having a body and a drive system supported on the body for driving ground engaging elements such as wheels. The drive system comprises an internal combustion engine configured to transmit power to an automatic transmission. The automatic transmission has at least an alternate forward start and a lower forward start gear and a lower forward start gear lock out feature. The machine further comprises one or more sensors for detecting environmental and machine conditions, and a transmission electronic controller in communication with the sensors, the engine, and the automatic transmission. The transmission electronic controller is configured to receive an output from at least one of the sensors, calculate whether the environmental and machine conditions will inhibit forward movement of the machine to the extent that the machine will have inadequate performance and, in response, initiate a downshift of the automatic transmission from the alternate forward start gear to the lower forward start gear. The sensors may include one or more of the following: an engine speed sensor, a transmission speed sensor, an oil temperature sensor, a vehicle payload sensor and a percent grade sensor.

In still another aspect of the invention, a method of controlling an automatic transmission of a machine is provided. The automatic transmission may be of the type having at least an alternate forward start and a lower forward start gear and a lower forward start gear lock out feature. The method may include the steps of sensing at least one of preselected environmental and machine conditions; calculating whether the environmental and machine conditions warrant downshifting the automatic transmission from the alternate forward start gear to the lower forward start gear; and initiating a downshift from the alternate forward start gear to the lower forward start gear in response to the environmental and machine conditions. The sensing step may comprise sensing at least one of the following conditions: engine speed, transmission speed, transmission oil temperature, vehicle payload, or percent grade sensor.

DETAILED DESCRIPTION

While this invention may be embodied in many forms, there is shown in the figures and will herein be described in detail one or more embodiments, with the understanding that this disclosure is to be considered an exemplification of the principles of the invention and is not intended to limit the invention to the illustrated embodiments.

In the discussion that follows, the terms "alternate forward start gear" and "second gear" are sometimes used interchangeably and the terms "lower forward start gear" and "first gear" are sometimes used interchangeably, but with the understanding that the alternate forward start gear and lower forward start gear are not necessarily limited to those particular gears.

The present invention is intended for use in off-highway machines with automatic transmissions that have an alternate start (launch) gear besides first gear. These machines have an automatic transmission in which second gear (or a higher gear) is the default starting gear, which eliminates unnecessary shifting and can extend the lifetime of the transmission.

Figure 1:
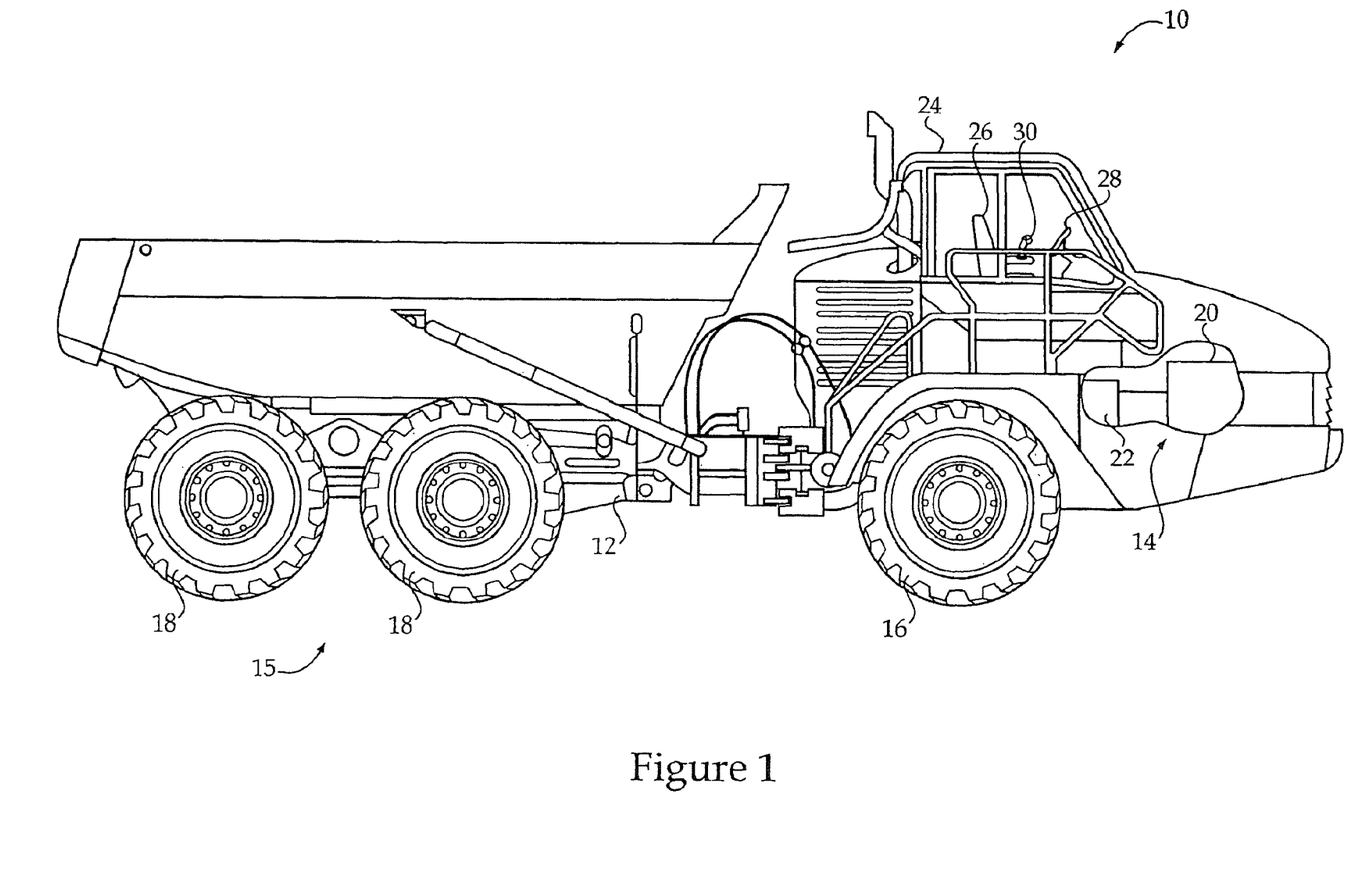
FIG. 1 is a partial cutaway side view of a machine according to the present invention.

Turning to the drawings, there is shown in FIG. 1 a side cutaway view of an exemplary machine 10 according to the present invention. The machine 10 may be an articulated truck, as shown, or any other on-highway or off-highway vehicle used to perform work operations. In the illustrated embodiment the machine 10 includes a body 12 having a drive system 14 supported thereon for driving ground engaging elements 15 such as front wheels 16 and/or rear wheels 18. A drive system 14 typically includes an internal combustion engine 20 configured to transmit power to a transmission, such as an automatic transmission 22. The automatic transmission 22 in turn may be configured to transmit power to the ground engaging elements 15 using any known means.

An operator control station 24 may be mounted to the machine body 12 and may include known devices, such as a seat assembly 26 and a steering device 28 that facilitate operator control of the machine 10. The operator control station 24 may also include various other devices including, for example, one or more machine operation controllers 30. For example, a machine operator controller 30 may be provided for inputting operator commands into a machine control system. In addition, a machine operator controller 30 such as a gear shift selector 30 or lever or "cane" may be provided for controlling a direction of movement of the machine 10, such as forward, neutral or reverse direction. The operator control station 24 may also include a specific machine operation controller 30 such as a throttle or gas pedal for selecting engine speed for the internal combustion engine 20. It should be appreciated that additional controls and devices may be included within the operator control station that are not discussed here.

Figure 2:
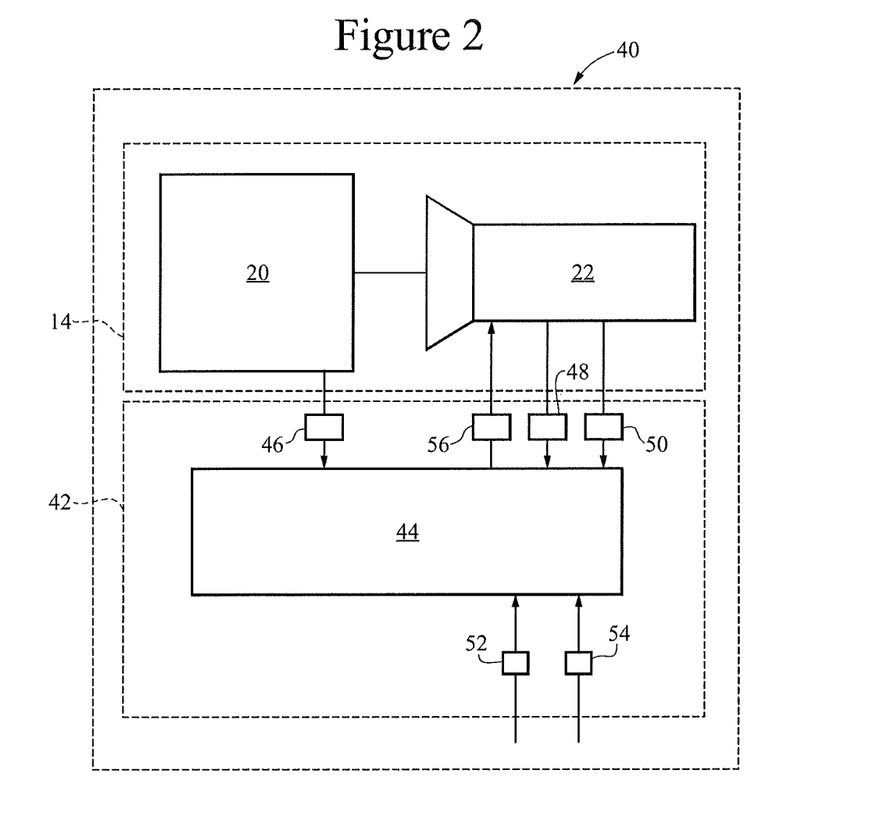
FIG. 2 is a schematic of an exemplary engine control system according to the present invention.

Turning to FIG. 2 there is shown an exemplary engine control system 40 for controlling the drive system 14, and other components, of a machine 10. The engine control system 40 may include the drive system 14, which comprises an internal combustion engine 20 and an automatic transmission 22, and also an electronic control system 42 according to the present invention.

The automatic transmission 22 may be similar to a typical automatic transmission for machines used in off road operations, having at least one reverse gear and four or more forward gears. Although first gear may be the lowest ratio gear, it is not always necessary to start out in first gear. Accordingly, many automatic transmissions used in off road machines incorporate an alternate forward start gear, typically second gear, which allows the machine to accelerate quicker and reduces the number of gear shifts made by the transmission. These transmissions commonly incorporate a lower forward start gear lock out feature that prevents the automatic transmission from operating in first gear.

Automatic transmissions of the kind described herein can operate in converter drive or direct drive. In converter drive, a torque converter is used to transmit engine torque to the automatic transmission. In direct drive, the torque converter is in lock up mode and engine torque is transmitted directly to the automatic transition without slippage.

In conventional off road machines with automatic transmissions having an alternate forward start gear and lower forward start gear lock out feature, putting the gear shift lever into the "D" position (normal forward operating mode) will cause the truck always to start in second gear. In addition, a conventional automatic transmission with a lower forward start gear lock out feature will prevent downshifting into first gear even when conditions warrant such a downshift. The only recourse available to a driver with a conventional automatic transmission having first gear lock out is to manually select a lower gear setting (such as D1 or D2) using the gear shift lever.

Prior to the present invention, none of these conventional automatic transmissions in normal (D) operating mode had the capability to automatically downshift from an alternate start gear to a lower ratio gear (typically first gear), thereby applying more torque to the machine wheels to prevent inefficient operation, even where environmental conditions and machine payload warranted a downshift.

By contrast, the present invention can initiate downshifting into first gear in response to various environmental and machine conditions either during start up or while the machine 10 is moving. The driver does not even have to be aware that the machine 10 is equipped with the transmission electronic controller 44 of the present invention, since downshifting to first gear will be done automatically, even in normal (D) operating mode.

The drive system 14 of the present invention may include a torque converter (not shown) fluidly connecting the internal combustion engine 20 and the automatic transmission 22. Since internal combustion engines 20 typically operate at higher rotational speeds than automatic transmissions, typically measured in revolutions per minute (RPM), the torque converter converts the higher engine RPM into a lower transmission or drive shaft RPM more suitable for starting and operating the machine 10.

The torque converter connects the internal combustion engine ultimately to the drive train, and the consequential inefficiency of the torque converter results in elevated operating temperatures. If a machine in normal drive mode (D) having a conventional engine control system encounters a steep grade while the automatic transmission is in second gear and the operator depresses the accelerator pedal, the torque converter will continue operating in second gear without transmitting sufficient power to the wheels to accelerate the machine to the point at which the torque converter lock-up clutch is applied and the machine returns to an efficient driving mode. The automatic control system 42 of the present invention remedies this situation.

A further component of the automatic control system 42 is a transmission electronic controller 44 that can control the downshifting capability of the automatic transmission 22.

The automatic downshifting capability of the transmission electronic controller 44 incorporates outputs from various sensors, including without limitation an engine speed sensor 46, a transmission speed sensor 48 and an oil temperature sensor 50, which measures the oil temperature in the torque converter or transmission. Other optional sensors that may provide input to the transmission electronic controller 44 include a machine payload sensor 52 and a percent grade sensor 54.

The transmission electronic controller 44 receives these inputs and then executes the necessary algorithm(s) to determine whether to initiate a downshift command by sending an on or off signal to one or more solenoid valves 56 or other controllers operably connected to the automatic transmission 22.

The steps implemented by the electronic transmission controller 44 may be in the form of computer readable program code stored in a memory bank of the transmission electronic controller 44 and executed by a processor. The method may run continuously, as part of the shift control logic (SCL) for the automatic transmission 22, or may be initiated by a specific event, such as high transmission or torque converter oil temperature.

The transmission electronic controller 44 may receive inputs external to the SCL (such as from the sensors) as well as feedback signals internal to the SCL. External signals (such as engine speed, transmission speed, torque converter oil temperature, etc.) are processed in input processing function.

For example, if torque converter oil temperature reaches a maximum temperature specified for the machine 10, then the electronic transmission controller 44 can set the lower forward starting gear as a new minimum gear. If the automatic transmission 22 is sitting in converter drive at the time, then the automatic transmission can shift to first gear in response to the high torque converter oil temperature.

In another example, if the automatic transmission 22 is under high load (in which, for example, throttle position and engine load are above 95% and the automatic transmission 22 is in direct drive and in second gear or higher), then the electronic transmission controller 44 again can set the minimum gear to first gear. As a result, for example, a loaded machine pulling up a large grade can downshift all the way to first gear if needed without operator intervention.

The start gear subsystem of the electronic transmission controller 44 allows switching to first gear from second gear at any time, but cannot exit first gear as the minimum start gear until the automatic transmission 22 reaches another gear normally such as through direction shift or normal upshift.

In other words, if the transmission electronic controller 44 ever switches the minimum available gear to first gear, then the machine 10 cannot exit first gear as minimum gear until it does so normally (by, say, reaching a first gear upshift speed to second). Once these conditions occur, the minimum gear can then transition back to the alternate forward starting gear (second gear). This keeps the automatic transmission 22 from switching back and forth between first and second gear due to the minimum start gear changing back and forth.

Figure 3:
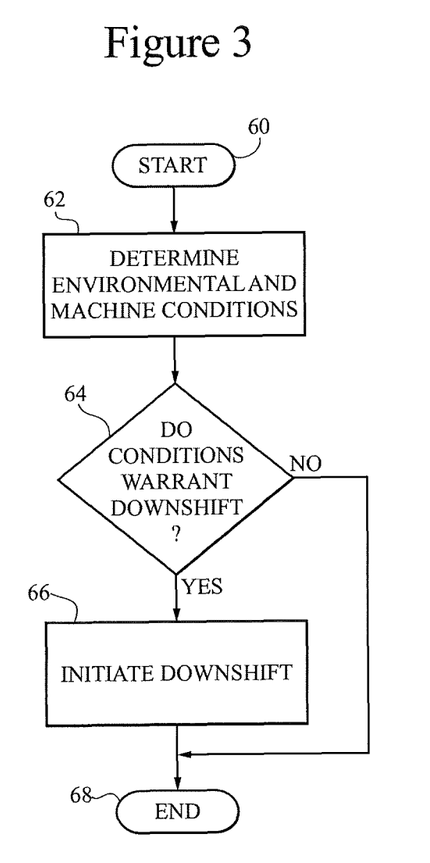
FIG. 3 is a logic flow chart showing one embodiment of a method according to the present invention for automatically downshifting an automatic transmission in response to conditions that might otherwise cause the machine to have inadequate performance.

FIG. 3 is a logic flow chart showing a generalized embodiment of a method for causing an automatic transmission 22 having an alternate start gear to automatically downshift when the transmission electronic controller 44 senses that more power is needed. Beginning at Box 60 (START), the method involves a first step 62 of determining certain environmental and machine conditions ("conditions"). These conditions can include, without limitation, one or more of the following: engine RPM, transmission RPM, transmission or torque converter oil temperature, machine load and percent grade of the terrain below the machine.

During the next step 64 the transmission electronic controller 44 executes the necessary mathematical calculation to determine whether to initiate a downshift command to enhance performance and economy. If the conditions do not warrant a downshift, the transmission electronic controller 44 does not initiate one and the automatic transmission 22 remains in its default starting gear, typically second gear. In other words, the transmission electronic controller 44 allows second gear starting and inhibits first gear operation. If the conditions do warrant a downshift, in a further step 66 the transmission electronic controller 44 sends a command to a solenoid valve 56 or other type of controller which initiates a downshift in the automatic transmission 22 to the lower start gear. In other words, the transmission electronic controller 44 disables second gear starting and allows a downshift to first gear. The method ends at box 68, after a downshift has or has not been made.

Figure 4:
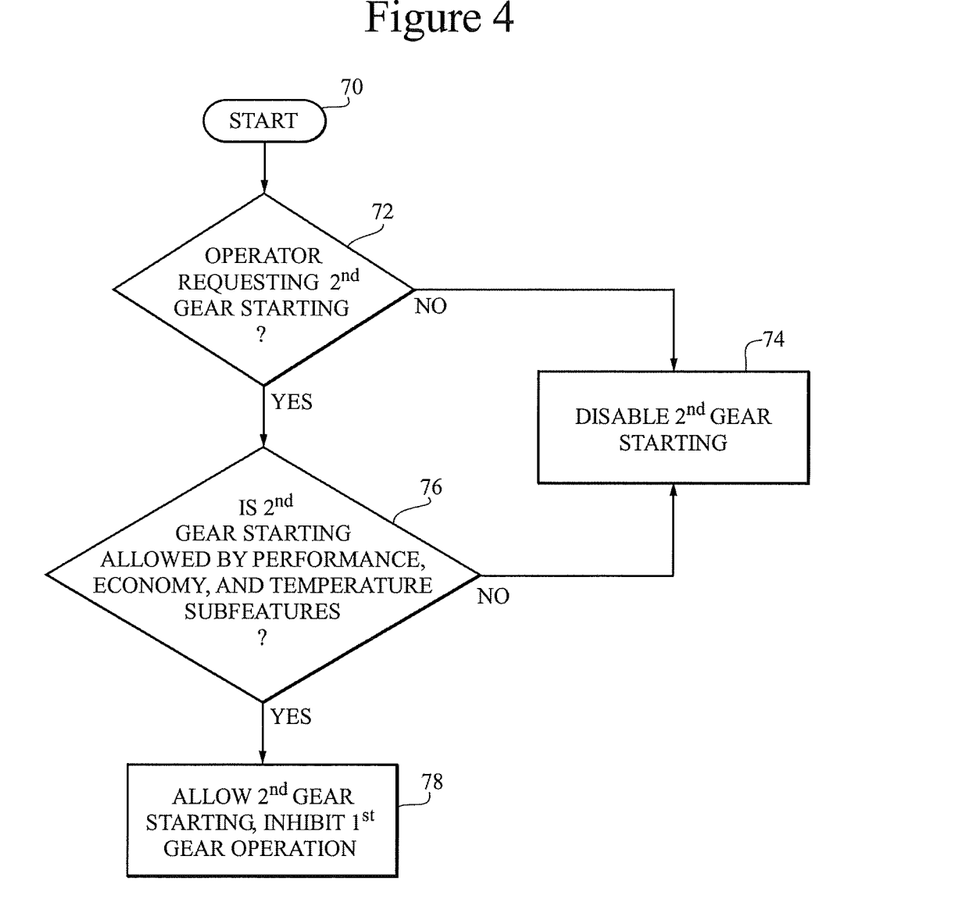
FIG. 4 is a logic flow chart showing an embodiment of a method according to the present invention for disallowing an initial operator selection of second gear

FIG. 4 is a logic flow chart showing an embodiment of a method for disallowing an initial operator selection of second gear if conditions, such as high torque converter temperature, warrant. Beginning at Box 70 (START), the method involves a first step 72 of determining whether the operator is requesting second gear starting. If the operator is not, then at step 74 the transmission electronic controller 44 disables second gear starting, thereby allowing a first gear start up. If the operator is requesting second gear starting (by, for example, putting the shift selector into normal (D) drive), then in step 76 the system determines whether the environmental and machine conditions, such as machine performance, economy and torque converter oil temperature, allow for second gear starting. If not, because, for example, second gear start up would result in inadequate machine performance, then the process advances to step 74 and first gear starting is allowed. If the conditions do allow for second gear starting, the process moves to a next step 78 in which the transmission electronic controller 44 allows second gear starting and inhibits first gear operation.

Figure 5:
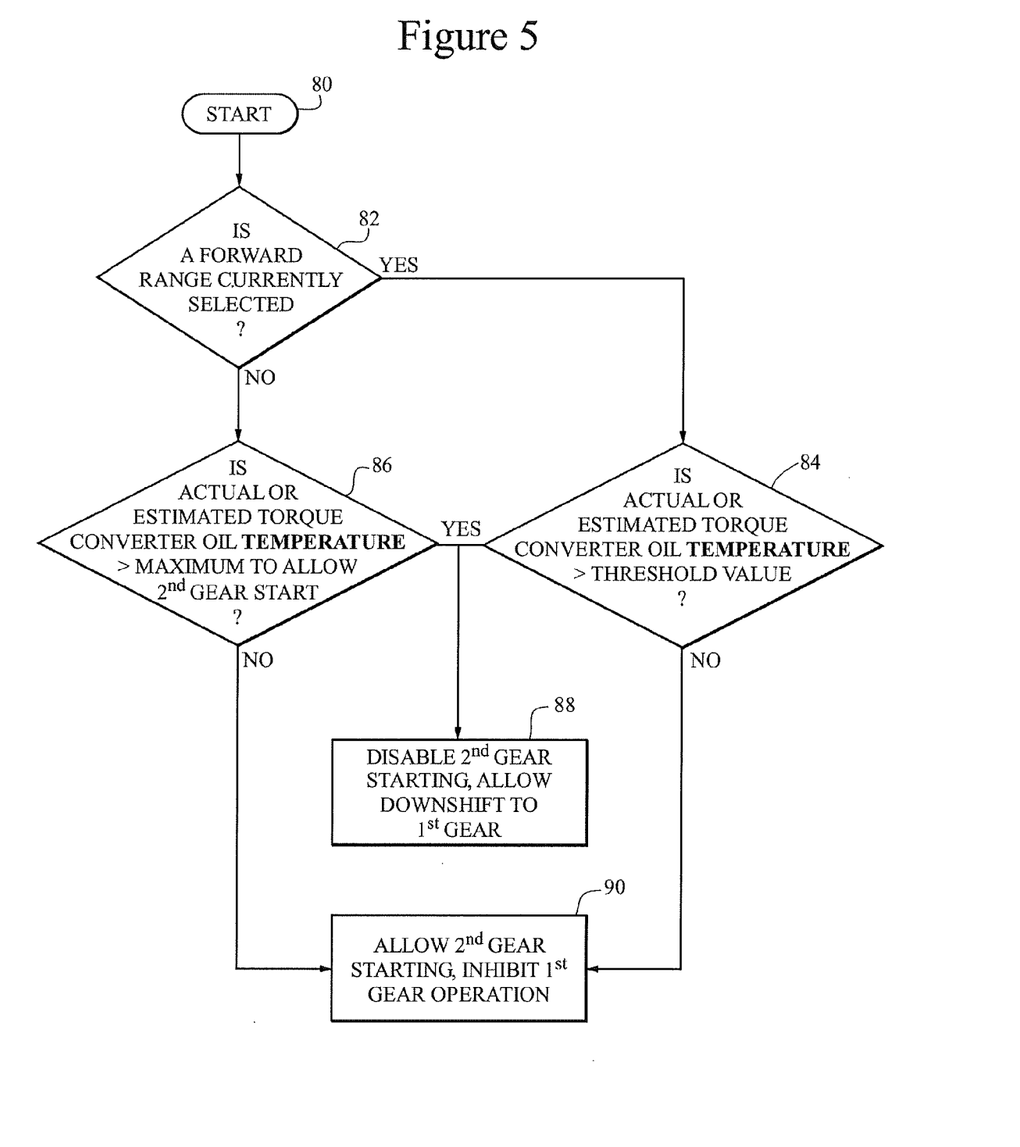
FIG. 5 is a logic flow chart showing an embodiment of a method according to the present invention for overriding an operator's request for second gear if conditions require a lower gear.

FIG. 5 is a logic flow chart showing an embodiment of a method for overriding an operator's request for second gear when conditions require a lower gear. Beginning at box 80 (START), the method involves a first step 82 of determining whether a forward drive range (as opposed to neutral or reverse) is currently selected. If so, then the process advances to a next step 84 of determining whether the actual or estimated torque converter oil temperature exceeds a predetermined threshold value which could cause inefficient machine operation. If the actual or estimated torque converter oil temperature does exceed the predetermined threshold value the process advances to a next step 88 of disabling second gear and allow a downshift to first gear. If the actual or estimated torque converter oil temperature does not exceed the predetermined threshold value, the process advances to step 90 in which the automatic transmission 22 is allowed to start in second gear (second gear enabled) and first gear operation is inhibited.

If at step 82 forward range is not currently selected, the process advances to a next step 86 of determining whether the actual or estimated torque converter oil temperature exceeds a maximum allowable temperature for a second gear start. If the actual or estimated torque converter oil temperature does exceed the maximum allowed for a second gear start, the process advances to a step 88 of disabling second gear and allow a downshift to first gear. If the actual or estimated torque converter oil temperature does not exceed the maximum allowable temperature for a second gear start, the process advances to step 90 in which the automatic transmission 22 is second gear enabled and first gear operation is inhibited.

An operator may override the first gear lock out feature of the transmission electronic controller 44, and thus the machine 10, by inputting the appropriate command via a touch screen, personal computer or other means operably connected to the electronic transmission controller 44, so that first gear can be the start gear. Absent operator override of the first gear lock out feature, the transmission will ordinarily start in second gear, but the transmission electronic controller 44 will be in automatic downshift mode and will automatically decide which gear is the appropriate start gear based on inputs to the transmission electronic controller 44.

As noted above, the operator can turn off the first gear lock out feature of the transmission electronic controller 44. When this is done, the programmed start gear is not the alternate forward starting gear (second gear) but the lower forward starting gear. If the programmed input is not the alternate forward starting gear (second gear), then the SCL always selects the lower forward starting gear (first gear) as the start gear.

The operator can also override the first gear lock out feature by selecting a lower gear drive. A typical machine gear shift selector 30 will have a drive mode (D) and one or two lower gear drives such as second drive (D2) and first drive (D1). If the gear shift selector 30 is in normal drive (D) mode, the system assumes the operator wants the starting gear to be a higher gear than first gear (such as second gear or higher). While in normal drive (D) mode, the electronic control system 40 monitors the environmental and machine conditions that may cause a lower forward starting gear start and can initiate a downshift to the lower forward starting gear if needed. If the gear shift selector 30 input is a lower gear ratio such as D1 or D2, then the forward starting gear will be a lower gear (such as first gear).

It should be understood that the inputs (conditions) to the transmission electronic controller 44 can vary according to need, and that not all inputs need be part of the control system process. The following examples are for illustrative purposes only and are not intended to limit the scope of the invention. In the first example the input is transmission or torque converter oil temperature. In the second and third examples described below the inputs are grade and payload.

EXAMPLE 1

Torque Converter Oil Temperature

As explained above, a torque converter hydrodynamically couples the engine to the transmission input. This coupling provides many advantages, such as allowing the engine to operate within its normal speed operating range while the output speed of the torque converter is very low such as when the machine is being launched from a standstill. Operation in converter drive is less efficient than a direct mechanical coupling, however, and torque converters typically feature a direct mechanical coupling device (a lockup clutch) to mechanically bypass the hydrodynamic coupling of the torque converter. If the load conditions imposed upon the machine are sufficient to prevent the machine from reaching a speed where the torque converter lockup clutch may be engaged, the machine will continue to operate in the relatively inefficient torque converter drive mode, resulting in the torque converter inefficiency characteristics contributing a significant amount of heat to the torque converter oil.

In one example of the present method, the transmission electronic controller 44 monitors the torque converter oil temperature across time via the oil temperature sensor 50. If the transmission electronic controller 44 senses that the oil temperature in the torque converter is rising and will reach some critical value before torque lock-up occurs, then the transmission electronic controller 44 will send a command to the transmission 22 to allow a downshift to first gear, where the lock-up clutch can be engaged and sufficient torque can be transferred to the machine wheels to either start or accelerate the machine.

The transmission electronic controller 44 receives inputs (data) from sensors that can continually monitor the torque converter (transmission) oil temperature via the oil temperature sensor 22 during machine operation, so that a downshift can occur whenever the transmission electronic controller 44 senses that the machine 10 will not be reaching a speed sufficient to operate in second gear. The transmission electronic controller 44 can be designed to include a predetermined amount of time, say, ten seconds, in which torque lock-up must be achieved and the oil temperature in the torque converter level off before the transmission electronic controller 44 will cause an automatic downshift into first gear. When in first gear the lock-up clutch can be engaged and the transmission heat relieved.

The transmission electronic controller 44 can initiate a downshift to first gear when conditions, such as rapidly increasing torque converter oil temperature, warrant. The transmission electronic controller 44 is operable when the machine 10 is stationary or moving. The transmission electronic controller 44 is effective even when the operator of the machine 10 does not know or remember that the machine 10 he is operating has an automatic transmission 22 in which second gear is the default starting gear (and first gear is locked out). The transmission electronic controller 44 insures that the lock-up clutch can be engaged and inadequate performance (including stalling) can be averted.

EXAMPLE 2

Grade and Payload—While Moving

In another embodiment, the transmission electronic controller 44 incorporates inputs from the machine payload sensor 52 (which measures or estimates the machine payload) and/or the percent grade sensor 54 (which measures or estimates the grade of the terrain underneath the machine 10) and determines from those inputs whether a downshift is required, either while moving or while stationary.

In a machine 10 with a conventional automatic transmission 22 with first gear lock out, where the machine 10 is being loaded by an excavator on level terrain, the machine 10 typically will not have any difficulty starting in second gear. However, should the same machine 10, now fully loaded, accelerate until it is in fifth gear, for example, and then encounter a steep incline, the automatic transmission 22 will undergo sequential downshifts from fifth gear to fourth to third to second gear. Once in second gear, if machine deceleration continues, the automatic transmission 22 will disengage the lock-up clutch, putting the machine 10 into an inefficient gear state.

The present system remedies this problem. If the transmission electronic controller 44 detects that the automatic transmission 22 has undergone a sequential downshift from fifth to fourth to third to second gear and yet the machine 10 continues to decelerate due to "high load" conditions, such as a high payload and/or steep grade, the transmission electronic controller 44 will initiate a further downshift into first gear where torque converter lock-up is possible, rather than keeping the machine 10 in second gear as in a conventional transmission with first gear lock out.

A "high load" condition may occur when the machine payload exceeds a percentage of maximum payload and when the machine 10 is under high throttle. Thus, if the machine 10 has a high load (throttle position and engine load above 95%) and in normal drive (D) in second gear or higher, then the transmission electronic controller 44 will set the minimum gear to first, allowing a machine 10 pulling up a steep grade to downshift all the way to first gear if needed, without operator intervention.

EXAMPLE 3

Grade and Payload while Stationary (Preemptive Downshifting)

The transmission electronic controller 44 of the present invention also can be set to preemptively downshift when a critical machine payload and/or grade is detected before machine forward movement. Thus, rather than waiting for the engine or transmission speeds to signal a downshift or a signal from the oil temperature sensor 22 that the torque converter is overheating, the transmission electronic controller 44 can immediate assess whether or not second gear is the appropriate start up (launching) gear and initiate a downshift into first gear, if warranted. This preemptive downshifting function is particularly useful where certain conditions (such as machine load and grade) are known to cause transmission downshifts or overheating.

Industrial Applicability

The present invention may be used with heavy duty machines having automatic transmissions and first gear lock out, such as trucks used in heavy construction projects. More specifically, the invention may be used in large, off road hauling machines, including those equipped with EPA emissions compliant engines (such as Tier 1, 2, 3 or 4 hauling units).

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. An electronic control system for use with a machine, the machine having an engine and an automatic transmission, the automatic transmission having an alternate forward start gear and a lower forward start gear and a lower forward start gear lock out feature which causes the machine to start in the alternate forward starting gear, the electronic control system comprising:
    at least one sensor for detecting an environmental or machine condition which will inhibit forward movement of the machine to the extent that the machine will have inadequate performance;
    a transmission electronic controller in communication with the at least one sensor, the engine and the automatic transmission, wherein the transmission electronic controller is configured to receive an output from the at least one sensor, determine that the environmental or machine condition will inhibit forward movement of the machine to the extent that the machine will have inadequate performance, and in response initiate a downshift of the automatic transmission from the alternate forward start gear to the lower forward start gear; and
    an input device operably connected to the transmission electronic controller to enable an operator to override the lower forward start gear lock out feature so that the machine can start in the lower forward start gear; wherein
    the lower forward start gear lock out feature is activated when the automatic transmission is set to normal drive mode, and the electronic control system can initiate a downshift of the automatic transmission from the alternate forward start gear to the lower forward start gear while the automatic transmission is set to normal drive mode.

2. The electronic control system of claim 1 wherein the at least one sensor is selected from the group consisting of an engine speed sensor, a transmission speed sensor, an oil temperature sensor, a vehicle payload sensor and a percent grade sensor.

3. The electronic control system of claim 2 further comprising one or more solenoid valves operably connected to the automatic transmission, wherein the transmission electronic controller is configured to send an on or off signal to the one or more solenoid valves when initiating a downshift.

4. The electronic control system of claim 2 wherein the environmental and machine condition is engine RPM, transmission RPM or torque converter oil temperature.

5. The electronic control system of claim 2 wherein the environmental and machine condition is vehicle payload or percent grade.

6. The electronic control system of claim 1 wherein:
    the alternate forward start gear is second gear;
    the lower forward start gear is first gear; and
    the lower forward start gear lock out feature, when activated, prevents the machine from starting in second gear.

7. A machine comprising a body having a drive system supported thereon for driving ground engaging elements, the drive system comprising an internal combustion engine configured to transmit power to an automatic transmission, the automatic transmission having an alternate forward start gear and a lower forward start gear and a lower forward start gear lock out feature, the machine further comprising:
    one or more sensors for detecting at least one of environmental and machine conditions which will inhibit forward movement of the machine to the extent that the machine will have inadequate performance;
    a transmission electronic controller in communication with the one or more sensors, the engine and the automatic transmission, wherein the transmission electronic controller is configured to receive an output from at least one of the one or more sensors, determine that the at least one of environmental and machine conditions will inhibit forward movement of the machine to the extent that the machine will have inadequate performance, and in response initiate a downshift of the automatic transmission from the alternate forward start gear to the lower forward start gear; wherein
    the one or more sensors is an oil temperature sensor.

8. The machine of claim 7 further comprising one or more solenoid valves operably connected to the automatic transmission, wherein the transmission electronic controller is configured to send an on or off signal to the one or more solenoid valves when initiating a downshift.

9. A method of controlling an automatic transmission of a machine, the automatic transmission having an alternate forward start gear and a lower forward start gear and a lower forward start gear lock out feature, the method comprising:

sensing at least one of preselected environmental and machine conditions which will inhibit forward movement of the machine to the extent that the machine will have inadequate performance;

calculating whether the environmental and machine conditions warrants downshifting the automatic transmission from; and initiating a downshift from the alternate forward start gear to the lower forward start gear in response to the environmental and machine conditions;

wherein the sensing, calculating and initiating steps occur prior to forward movement of the machine.

10. The method of claim 9 wherein the sensing step comprises sensing at least one of the following conditions: oil temperature, machine load, and grade.

11. The method of claim 10 wherein the sensing step comprises sensing machine load and grade.

12. The method of claim 9 wherein the sensing step comprises sensing engine RPM, transmission RPM or oil temperature.

13. The method of claim 9 wherein the sensing step comprises sensing machine load and grade.

\* \* \* \* \*